United States Patent [19]

Arnold et al.

[11] Patent Number: 5,749,963
[45] Date of Patent: May 12, 1998

[54] HARDENABLE MORTAR COMPOSITION

[75] Inventors: Norbert Arnold, Waldachtal; Willi Haug, Freudenstadt-Musbach; Stefan Lind, Waldachtal, all of Germany

[73] Assignee: fischerwerke, Artur Fischer GmbH & Co. KG, Waldachtal, Germany

[21] Appl. No.: 799,272

[22] Filed: Feb. 13, 1997

[30] Foreign Application Priority Data

Mar. 7, 1996 [DE] Germany ............... 196 08 807.0

[51] Int. Cl.⁶ ............... C04B 24/00; C04B 24/04; C04B 24/24; C04B 24/40
[52] U.S. Cl. ............... 106/724; 106/719; 106/722; 106/728; 106/732; 106/773; 106/774; 106/778; 106/781; 106/800; 106/802; 106/803; 106/806; 106/807; 106/810; 106/811; 106/819; 106/822; 106/823; 524/3; 524/4; 524/5
[58] Field of Search ............... 106/802, 807, 106/819, 822, 823, 719, 722, 724, 728, 732, 773, 774, 778, 781, 800, 803, 806, 810, 811; 524/3, 4, 5

[56] References Cited

U.S. PATENT DOCUMENTS

| 4,096,944 | 6/1978 | Simpson | 106/784 |
| 4,126,005 | 11/1978 | Coursen | 106/807 |
| 4,126,009 | 11/1978 | Tomic | 106/802 |
| 4,174,227 | 11/1979 | Tomic | 106/690 |
| 4,338,048 | 7/1982 | Murphy et al. | 106/724 |
| 4,891,072 | 1/1990 | Cooper | 106/660 |
| 5,076,986 | 12/1991 | Delvaux et al. | 106/698 |
| 5,302,200 | 4/1994 | Smetana et al. | 106/705 |
| 5,546,725 | 8/1996 | Haug | 52/698 |
| 5,575,846 | 11/1996 | Arnold et al. | 106/802 |

FOREIGN PATENT DOCUMENTS

| 3416094A1 | 10/1985 | Germany . |
| 4100386A1 | 7/1992 | Germany . |
| 4238177A1 | 5/1994 | Germany . |
| 4342887A1 | 6/1995 | Germany . |
| 4432879A1 | 3/1996 | Germany . |

OTHER PUBLICATIONS

Roempp Chemie Lexicon, Georg Thieme Verlag Stuttgart, New York. 9–th Ed., entry "Hydrophobieren", [No Date].
Product Information Sheet From DeGussa Chemical Corporation, [No Date].

*Primary Examiner*—Anthony Green
*Attorney, Agent, or Firm*—Michael J. Striker

[57] ABSTRACT

The hardenable mortar composition consists of a bonding agent component including a hydraulic bonding agent, such as cement, gypsum or mortar, and a paste-forming agent consisting of a liquid solvent inert with respect to the hydraulic bonding agent, and an aqueous component kept separate from the bonding agent component until the two components are mixed to form a hardened mortar composition. The aqueous component includes water and a hydrophobic adsorbent or absorbent. The hydrophobic adsorbent or absorbent is included in the aqueous component to avoid the emergence of the paste-forming agent, which is at the very least unsightly, when the aqueous component is mixed with the bonding agent component. The hydrophobic adsorbent or absorbent binds the paste-forming agent which would otherwise escape during mixing and remains as an inert additive in the setting mortar composition, without reducing the hardness thereof.

15 Claims, No Drawings

HARDENABLE MORTAR COMPOSITION

BACKGROUND OF THE INVENTION

The invention relates to a hardenable mortar composition comprising a bonding agent component and an aqueous component which are kept separate from one another, for example, in a shell or a cartridge.

A shell shall be understood to mean a crushable receptacle which contains one of the two components of the mortar composition and one or more inner containers containing the other component of the mortar composition. The shell is inserted, for example, into a drilled hole, is crushed by means of an anchor that is to be anchored in the drilled hole, and the two components are mixed with one another by rotation of the anchor. A cartridge shall be understood to mean a two or multi-compartment container, in the compartments of which the two components of the mortar composition are contained separately from one another. The components are arranged to be forced through a mixing nozzle in a predetermined mixture ratio and, as they are forced through it, they are mixed with one another in the mixing nozzle.

A mortar composition of the kind mentioned in the introduction is known from German Published Patent Application P 44 32 879. The known mortar composition includes a mineral mortar, which hardens with the addition of water, as the bonding agent component, and a non-polar solvent that is inert with respect to the mineral mortar as the paste-forming agent. By mixing the mortar with the solvent to form a mortar component the mortar is rendered paste-like, that is, its bulk density is increased three or fourfold. In this manner a significantly larger amount of mortar can be accommodated in a given volume. Furthermore, the densities of the two components of the mortar composition are rendered similar and the flow behavior of the mortar is improved. Any formation of lumps as the mortar composition is being mixed in the mixing nozzle of a two-compartment cartridge is avoided. The second component of the known mortar composition is water or a preparation containing predominantly water.

To prepare the mortar composition, the components thereof are mixed with each other, the water displacing the paste-forming agent from the mortar by virtue of the very different polarities of the polar mortar and the non-polar paste-forming agent. The mortar sets hydraulically and the paste-forming agent escapes from the mixed mortar composition. As a result, the paste forming agent escapes from a drilled hole or similar construction into which the mixed mortar composition has been introduced and, for example, dribbles down a wall or from a ceiling. This is accompanied at least by the disadvantage of being unsightly. Moreover, the escaping paste-forming agent may give the user the impression that the mortar composition is not properly mixed and is not setting correctly. Paste-forming agent dribbling down a wall, for example, is not acceptable if the surface of the wall is already in its finished state. Moreover, the paste-forming agent can chemically alter the surface with which it comes into contact, in particular, can discolor it undesirably.

SUMMARY OF THE INVENTION

It is an object of the present invention to provide a mortar composition of the above-described kind in which the paste-forming agent does not escape from the mixed or setting mortar composition.

According to the invention, this hardenable mortar composition contains

- a bonding agent component comprising a hydraulic bonding agent and a paste-forming agent consisting of a liquid solvent that is inert with respect to the hydraulic bonding agent; and
- an aqueous component which is kept separate from the bonding agent component until the two components are mixed to form a hardened mortar composition and which comprises water and a hydrophobic adsorbent or absorbent.

A hydrophobic adsorbent or absorbent is suspended in the water of the mortar composition according to invention. The aqueous component, which includes water and the hydrophobic adsorbent or absorbent, is kept separate from the bonding agent component until the two components are mixed. The hydrophobic adsorbent or absorbent is inert with respect to water and also with respect to the mixed mortar composition. During mixing, the hydrophobic adsorbent or absorbent binds the non-polar paste-forming agent that is displaced from the bonding agent component. The hydrophobic adsorbent or absorbent together with the bonded paste-forming agent remains finely divided as an inert additive in the hydraulically setting mortar composition, without influencing the strength of the hardened mortar composition. The invention has the advantage that the paste-forming agent remains in the mixed mortar composition without impairing the properties thereof.

Hydrophobic adsorbents or absorbents of the aqueous component of the mortar composition according to the invention can be silicate-based hydrophobic substances, for example, silica gels, zeolites or diatomaceous earth, modified so as to be hydrophobic in each case. They can be rendered hydrophobic by chemical means such as, for example, functionalized silanes or by specific structural change, for example exchange of aluminum atoms for silicon atoms. Furthermore, activated carbon can be considered as hydrophobic adsorbent or absorbent.

A thickening agent, (for example, modified cellulose, (meth)acrylic acid polymers, polyvinyl alcohol or similar water-soluble polymers) can be added to the aqueous component. In one embodiment of the invention the aqueous component is adjusted with a thixotropic agent so that it behaves as a paste without the action of shear forces. By that means, especially when the mortar composition is contained in a shell, the aqueous component is prevented from flowing away once the shell has been crushed. Forces occurring as the two components of the mortar composition are mixed reduce the viscosity of the aqueous component so that the two components can be mixed together well in order to ensure complete setting of the mortar composition and thus a high strength of the hardened mortar composition.

A suitable thixotropic agent is, for example, amorphous pyrogenic silicic acid which is admixed with the aqueous component in an amount of 0.5% by weight to 10% by weight. The hydraulic bonding agent contained in the bonding agent component can be cement, gypsum or quicklime.

Water-insoluble, non-polar solvents have proved especially advantageous for making the hydraulic bonding agent of the bonding agent component into a paste. The difference between polar bonding agent and non-polar solvent causes the solvent forming the paste-forming agent to be displaced spontaneously from the bonding agent component as the two components are mixed. The hardening process of the mortar composition therefore proceeds unaffected by the paste-forming agent, so that no loss of strength occurs once the hardening process is completed. Water-insoluble, non-polar solvents suitable as paste-forming agents include saturated hydrocarbons, for example, alkanes, such as hexane or heptane, ethers, chlorinated hydrocarbons such as dichloromethane, fluorocarbons, silicone oils, paraffin oils and other alkali-resistant oils.

The proportion of the solvent in the bonding agent component can be from 5 to 50 percent by weight, preferably from 15 to 30 percent by weight.

The mortar composition according to the invention can include additional components in addition to the bonding agent component and to the aqueous component, and/or may have additives. The addition of amphoteric substances, such as soaps or surfactants, enables the proportion of solvent required in the bonding agent component to be reduced. It is advantageous if the substance itself is in liquid form and is therefore already effective in forming a paste. Such substances can be acrylate-based or siloxane-based low-molecular weight polymers with polar side chains such as alkoxy groups or oligoethylene oxide chains. The proportion of these substances in the composition according to the invention is approximately from 0.005 to 10%, in particular from 0.01 to 5%, relative to the paste-forming agent.

The addition of low-molecular weight, very viscous polymers having a molecular weight of about 400 to 2500 g/mol to the bonding agent component has the advantage that the polymers stabilize the bonding agent that has been made into a paste; that is, they prevent separation during storage or during extrusion from a cartridge. Such polymers are, for example, siloxanes, acrylates, vinyl esters, preferably present in the composition according to the invention in an amount of 1–30%, in particular 3–20%, in relation to the paste-forming agent.

EXAMPLES

Examples of formulations of the mortar compositions according to the invention:

Example 1
  Bonding agent component:
    50 parts mineral mortar,
    8 parts paraffin oil
    5 parts low-molecular weight silicone resin
  Aqueous component:
    15 parts water
    1 part pyrogenic silicic acid
    6 parts hydrophobic zeolite
Example 2
  Bonding agent component:
    50 parts mineral mortar,
    8 parts paraffin oil
    5 parts low-molecular weight silicone resin
  Aqueous component:
    18 parts water
    1.5 parts activated carbon
    1.5 parts pyrogenic silicic acid
    3 parts hydrophobic zeolite
Example 3
  Bonding agent component:
    17 parts alkane mixture, boiling point 180–260° C.
    0.4 parts pyrogenic silicic acid that has been rendered hydrophobic
    2 parts acrylic-based oligomeric surfactant
    160 parts mineral mortar
  Aqueous component:
    40 parts water
    3 parts silicic acid Unless indicated otherwise, all percentages and parts are percentages by weight and parts by weight respectively.

The disclosure of German Patent Application 196 08 807.0 of Mar. 7, 1996 is incorporated here by reference. This German Patent Application discloses the invention described hereinabove and claimed in the appended claims and is the basis for a claim of priority under 35 U.S.C. 119.

While the invention has been illustrated and described as embodied in a hardenable mortar composition, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:
1. A hardenable mortar composition containing
  a bonding agent component comprising a hydraulic bonding agent and a paste-forming agent, said paste-forming agent consisting of a water-insoluble, non-polar liquid solvent inert with respect to the hydraulic bonding agent, said water-insoluble non-polar liquid solvent being present in said bonding agent component in an amount sufficient to form a paste; and
  an aqueous component comprising water and a hydrophobic adsorbent or absorbent for binding said water-insoluble non-polar liquid solvent when said aqueous component is mixed with said bonding agent component to form a mixture, said hydrophobic adsorbent or absorbent being present in said aqueous component in an amount sufficient to bind said water-insoluble non-polar liquid solvent when said aqueous component is mixed with said bonding agent component so that said water-insoluble non-polar liquid solvent remains in said mixture;
  wherein said aqueous component is kept separate from said bonding agent component until said aqueous component is mixed with said bonding agent component to form said mixture and said aqueous component and said bonding agent component are mixed in relative amounts such that said mixture hardens to form a hardened mortar composition.

2. The hardenable mortar composition as defined in claim 1, wherein the hydrophobic adsorbent or absorbent is activated carbon.

3. The hardenable mortar composition as defined in claim 1, wherein the aqueous component includes a thixotropic agent so that said aqueous component behaves as a paste when shear forces are not applied to the aqueous component.

4. The hardenable mortar composition as defined in claim 3, wherein said thixotropic agent is amorphous pyrogenic silicic acid and from 0.5% to 10% by weight of said amorphous pyrogenic silicic acid is present in said aqueous component.

5. The hardenable mortar composition as defined in claim 1, wherein the bonding agent component contains from 5 to 50 percent by weight of the water-insoluble non-polar liquid solvent.

6. The hardenable mortar composition as defined in claim 1, wherein the bonding agent component contains from 15 to 30 percent by weight of the water-insoluble non-polar liquid solvent.

7. The hardenable mortar composition as defined in claim 1, wherein said water-insoluble non-polar liquid solvent is selected from the group consisting of alkanes, ethers, chlorinated hydrocarbon, fluorocarbons, silicone oils and paraffin oils.

8. The hardenable mortar composition as defined in claim 1, wherein the bonding agent component includes an amphoteric surfactant.

9. The hardenable mortar composition as defined in claim 8, wherein said amphoteric surfactant is a liquid.

10. The hardenable mortar composition as defined in claim 8, containing from 0.01 to 5% by weight of said amphoteric surfactant, relative to a total amount of the water-insoluble non-polar liquid solvent present.

11. The hardenable mortar composition as defined in claim 1, wherein the bonding agent component includes a siloxane polymer, an acrylate polymer or a vinyl ester polymer having a molecular weight of from 400 to 2500 g/mol.

12. The hardenable mortar composition as defined in claim 11, containing from 2 to 20% by weight of said polymer, relative to the water-insoluble non-polar liquid solvent present.

13. A hardenable mortar composition containing a bonding agent component comprising a hydraulic bonding agent and a paste-forming agent, said paste-forming agent consisting of a water-insoluble, non-polar liquid solvent inert with respect to the hydraulic bonding agent, said water-insoluble non-polar liquid solvent being present in said bonding agent component in an amount sufficient to form a paste; and an aqueous component comprising water and a hydrophobic adsorbent or absorbent for binding said water-insoluble non-polar liquid solvent when said aqueous component is mixed with said bonding agent component to form a mixture, said hydrophobic adsorbent or absorbent being present in said aqueous component in an amount sufficient to bind said water-insoluble non-polar liquid solvent when said aqueous component is mixed with said bonding agent component so that said water-insoluble non-polar liquid solvent remains in said mixture;

wherein said aqueous component is kept separate from said bonding agent component until said aqueous component is mixed with said bonding agent component to form said mixture and said aqueous component and said bonding agent component are mixed in relative amounts such that said mixture hardens to form a hardened mortar composition; and wherein the hydrophobic adsorbent or absorbent is a hydrophobic silica gel, a hydrophobic zeolite, or a hydrophobic diatomaceous earth.

14. The hardenable mortar composition as defined in claim 13, wherein the hydraulic bonding agent comprises at least one member selected from the group consisting of cement, gypsum and quicklime.

15. A hardenable mortar composition containing a bonding agent component comprising
a hydraulic bonding agent consisting of at least one member selected from the group consisting of cement, gypsum and quicklime and
a paste-forming agent consisting of a water-insoluble, non-polar liquid solvent selected from the group consisting of alkanes, ethers, chlorinated hydrocarbon, fluorocarbons, silicone oils and paraffin oils, wherein the hydraulic bonding agent and the paste-forming agent are present in relative amounts sufficient to form a bonding paste; and an aqueous component comprising water and a hydrophobic adsorbent or absorbent for binding said water-insoluble non-polar liquid solvent when said aqueous component is mixed with said bonding agent component to form a mixture, said hydrophobic adsorbent or absorbent being present in said aqueous component in an amount sufficient to bind said water-insoluble non-polar liquid solvent so that said water-insoluble non-polar liquid solvent remains in said mixture;

wherein said aqueous component is kept separate from said bonding agent component until said aqueous component is mixed with said bonding agent component to form said mixture, and said aqueous component and said bonding agent component are mixed in relative amounts such that said mixture hardens to form a hardened mortar composition; and wherein the hydrophobic adsorbent or absorbent is a hydrophobic silica gel, a hydrophobic zeolite, or a hydrophobic diatomaceous earth.

* * * * *